Sept. 7, 1965   C. H. WALLACE   3,204,844
METHOD AND APPARATUS FOR PRODUCING WIENERS
Filed July 25, 1962   2 Sheets-Sheet 1
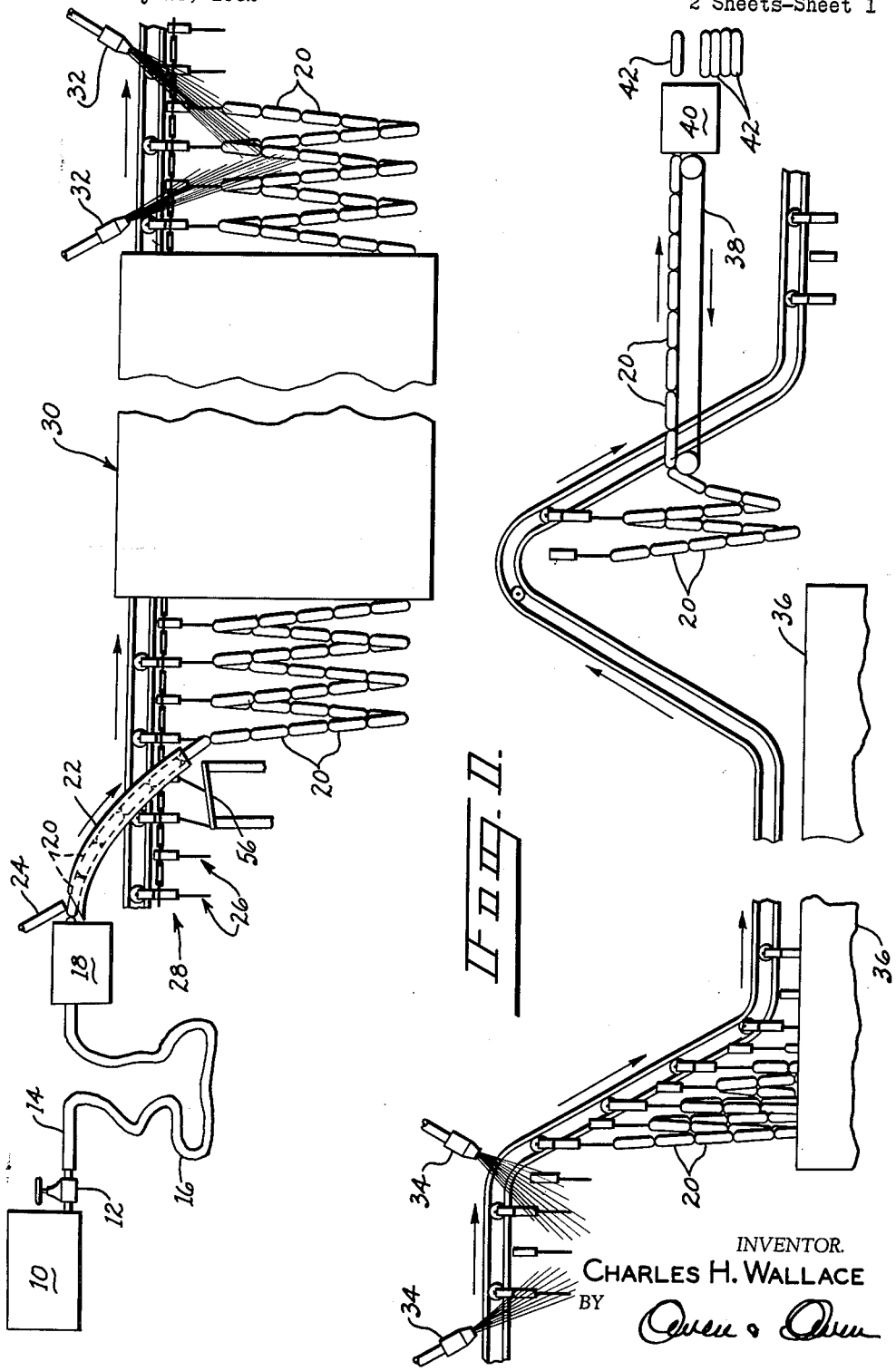
INVENTOR.
CHARLES H. WALLACE
BY
ATTORNEYS

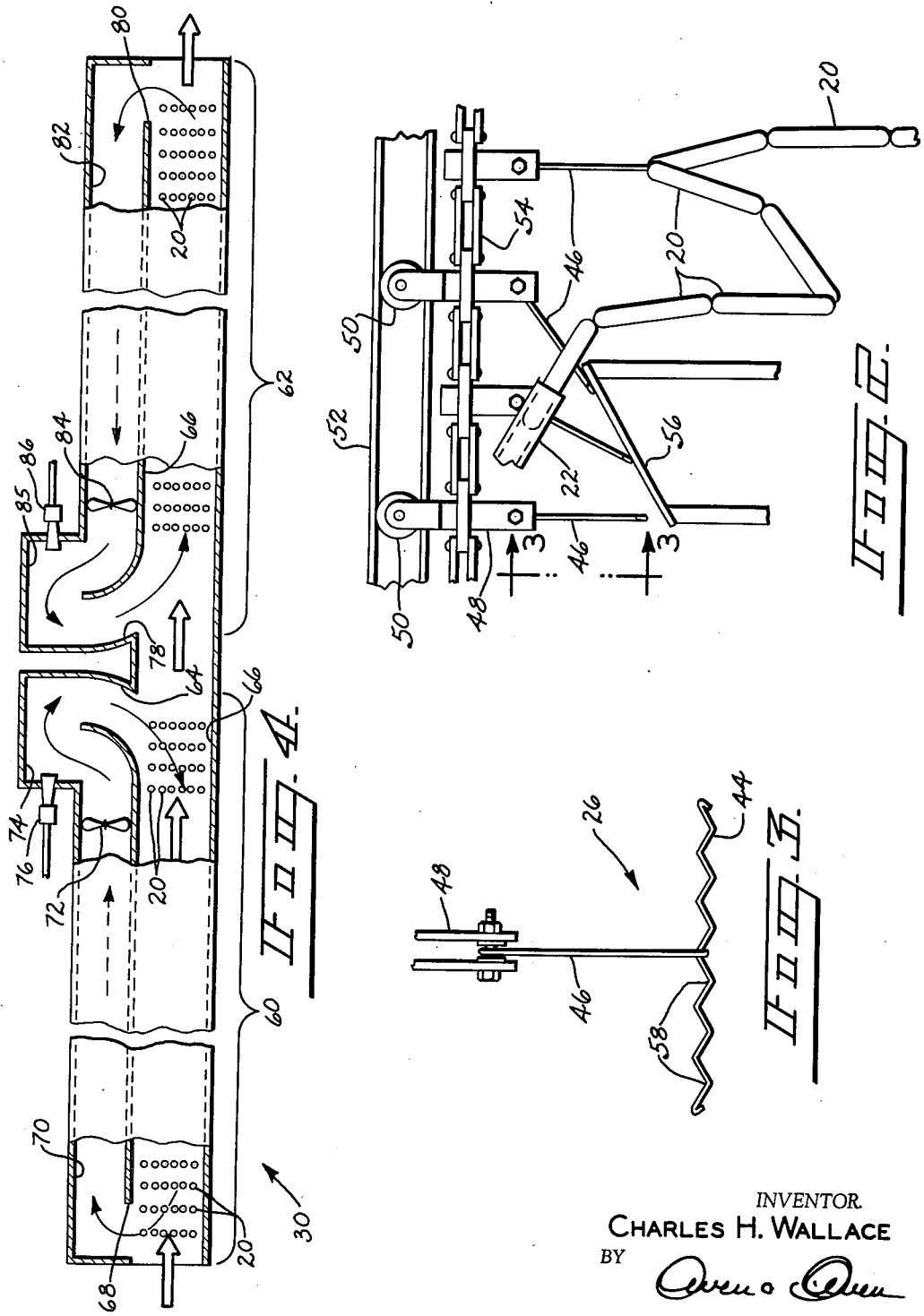

United States Patent Office 3,204,844
Patented Sept. 7, 1965

3,204,844
METHOD AND APPARATUS FOR PRODUCING WIENERS
Charles H. Wallace, Toledo, Ohio, assignor, by mesne assignments, to Schmidt-Wallace, Inc., Toledo, Ohio, a corporation of Ohio
Filed July 25, 1962, Ser. No. 212,306
4 Claims. (Cl. 226—104)

This invention relates to an improved method and apparatus for producing wieners and particularly to a method and apparatus for producing cured skinless wieners.

Previously, wieners have been made by encasing the ground meat product in intestinal gut which formed part of the final food product. In recent years, this process has been largely abandoned and replaced by a process in which the ground meat product employed in the wiener has been encased in a long cellulose tube, tied into uniform lengths and brought up to curing temperature. Subsequently, the cellulose casing is removed so that the wiener consists of the ground meat product only. This product has become known as a skinless wiener. The prior wiener with the intestinal casing was relatively chewy because of the relatively tough casing material. In contrast, the skinless wiener is quite tender, having no corresponding outer reinforcement. It has been discovered, however, that a certain degree of toughness or chewiness in the wiener is desired by the consumer, and that the saleability of the product is actually enhanced thereby. It has further been discovered, in accordance with the invention, that the heating process used in the production of the wiener can be modified to produce a desired degree of so-called toughness therein and overcome the above disadvantage.

In the production of wieners, the ground meat product is first forced, in a relatively fluid state, into the tubular cellulose casing, after which the casing is tied into wiener-length sections and then passed through an oven for the curing or treating step. The oven may or may not include an atmosphere of smoke. After heating, the wiener product is cooled and chilled and the casing is removed and the wiener units are then separated and packed. The heating or curing process employed in the production of the wiener is complex and at least four factors must be considered when developing a heating cycle. These factors include the overall length of time required for the curing, the degree of tenderness, the need for pasteurization, and the development of the proper color. Further, what is optimum for one factor often is detrimental for another, which makes the determination of the proper process even more difficult. Thus, as to the length of time, a short curing time and a short process are desired, in the interests of increased productivity and low cost, while, in contrast, the proper tenderness, or perhaps more correctly toughness, requires a substantial amount of time and a fairly high temperature. At the same time, pasteurization requires a high temperature, a minimum of approximately 152° F. at the inside of the meat, while color development requires a fairly long time but a relatively low temperature, in any case not exceeding approximately 165° F. To obtain the high temperatures required for pasteurization in a short and economical time cycle would tend to destroy the color of the product and would fail to attain the proper degree of toughness or texture because this is a product of both time and temperature.

The present invention relates to a method and apparatus for curing wieners in a manner such that the above four factors are satisfied to an extent not heretofore possible. The process basically includes passing the wieners through a curing oven which is maintained at relatively low temperatures, in the order of 140° F., at the charge end, which is at relatively high temperatures, in the order of 220° F., in the middle, and which again is at lower temperatures, in the order of 160° F., at the discharge end. The wieners are carried at a uniform rate through the oven in a period of time ranging from approximately ¾ to 1¼ hours. While the length of time is not as short as heretofore achieved, all three of the other factors, and particularly the color development and the degree of tenderness or toughness, are attained to an extent not heretofore possible.

It is, therefore, a principal object of the invention to provide an improved method and apparatus for producing wieners having the advantages set forth above.

Other objects and advantages of the invention will be apparent from the following detailed description of a preferred embodiment thereof, reference being made to the accompanying drawings, in which:

FIG. 1 is a somewhat schematic view in elevation of apparatus for producing wieners in accordance with the principles of the invention;

FIG. 2 is a fragmentary side view in elevation, upon an enlarged scale, of a portion of the apparatus shown in FIG. 1;

FIG. 3 is a fragmentary front view in elevation of part of the apparatus shown in FIG. 2; and FIG. 4 is a somewhat schematic view in longitudinal cross section of an oven or furnace shown in FIG. 1.

Referring more particularly to FIG. 1, the overall process for producing wieners will first be discussed. Accordingly, a source 10 of ground meat product, commonly known as a stuffer, forces the ground meat which will become the final wiener product through a valve 12, a nozzle 14 and, hence, into a long cellulose casing or tubing 16. The casing 16 conventionally comes in 84 foot lengths which are tied together, end-to-end, to provide a continuous operation. The filled casing is then fed through a tying machine 18 which ties the casing into individual uncured wiener sections 20 which remain connected in continuous, end-to-end relationship. The sections 20 are then fed through a plastic loading conduit 22, down which the sections 20 pass with the aid of a lubricating fluid such as water supplied through a nozzle 24.

In machines as they are known at the present time, the strings or lengths of wieners are cut to convenient lengths and are festooned by hand over arms of a cart. When the cart is completely loaded it is pushed into a smoke room and curing oven where the load remains until a predetermined time has passed when the cart is taken out for further processing. This batch process is not economical or satisfactory for many reasons, and its shortcomings are largely corrected by the present invention. According to the invention, after the wieners have passed through the tying machine 18 the continuous stream of wieners are loaded on hangers 26 of a conveyor indicated at 28, to be discussed subsequently in more detail. The wieners 20 then are fed through an oven or furnace 30 in which they are cured, the curing attaining a proper color, receiving a proper degree of toughness, and being pasteurized. Upon emerging from the oven 30, the now cured wieners 20 can be subjected to a steam bath with the aid of steam nozzles 32 in order to assure that the wiener sections reach the proper pasteurization temperature of 152° F. throughout their thickness. Subsequently, the wieners can be partially cooled with the aid of a spray of cool water from nozzles 34, after which they can be cooled further by being dipped into and passed through a tank 36 containing a circulating pool of suitable coolant, such as cold water. Upon leaving the tank 36, the now cooled and cured wiener sections 20 are removed by a horizontal take-off belt conveyor 38 as the hangers 26 move from a level above it to a level below it. The sections are then fed to a peeling machine 40 which removes the cellulose casing 16 and thereby separates the wiener sections 20 into final individual wiener products 42. These are then packaged by suitable apparatus to complete the overall process.

The unique loading apparatus, briefly discussed above in the overall process, will now be described in more detail, reference being made to FIGS. 2 and 3. The loading conduit 22 terminates just above cross bars 44 of the hanger 26 which are rigidly connected to vertical supports 46 which are pivotally mounted on yokes 48, alternate ones of which are supported through rollers 50 by a monorail 52. The various yokes are flexibly connected by a suitable chain 54 which is engaged by suitable drive mechanism (not shown). As the hangers 26 reach the mouth of the loading conduit 22, they are deflected rearwardly by a restraining plate 56 which separates the cross bars 44 of the hangers so that the wiener sections 20 can be easily deposited or hung therebetween from the conduit 22. The speed at which the wiener sections 20 are deposited from the conduit 22 and the speed of the chain 54 are regulated to deposit ten of the wiener sections 20 between each adjacent pair of the hangers 26, five wieners depending from one of the cross bars 44 and five depending from the next cross bar 44 as a festoon. This places the wiener sections 20 in substantially vertical positions and enables a maximum number of them to be carried in a minimum length of conveyor space. As shown in FIG. 3, the cross bar 44 also is provided with a plurality (in this case six) notches 58, with a row of the wiener sections 20 being received in each of the notches so that a total of six rows, in this instance, are carried by the hangers 26 which again provides a maximum number of the wiener sections in a given amount of volume. If six rows are used, six stuffing machines and six tying machines will be used to feed the conveyor hangers 26. Six of the take-off conveyors 38 also will be used, three on each side of the monorail.

Referring more particularly to FIG. 4 and the details of the oven 30 and the heating process, a first zone generally indicated at 60 and a second zone generally indicated at 62 are formed in the oven 30. In the first zone 60, heated fluid such as air is supplied through a supply duct 64 to a main heating passage 66 through which the wiener sections 20 are carried on the conveyor 28. The heated air passes toward the charge end of the oven 30 and then through an opening 68 to a return duct or passage 70 through which the air is carried past a circulating means such as a blower 72. The air then moves through a first fluid chamber 74 to which heat is supplied by a burner 76 to reheat the air to the initial supply temperature, restoring heat thereto which was lost by transfer to the wiener sections and to the oven walls. A somewhat similar arrangement is provided for the second zone 62. Heated air is supplied through a supply passage 78 with this air passing through the main passage 66 from the front end of the second zone 62 longitudinally therethrough toward the discharge end of the oven 30. The air then passes through a rear opening 80 and through a return duct or passage 82. The air is then forced by second circulating means such as a blower 84 through a second fluid chamber 85 heated by a burner 86. Because the wiener sections 20 move laterally through the passage 66, and laterally to the flow of air therethrough, the forward faces of the wiener sections 20 tend to receive slightly more heat in the first zone 60 while the rearward faces of the sections 20 receive somewhat more heat in the second zone 62. This provides substantially uniform heating of the wiener sections while enabling a maximum number of them to be processed in a minimum amount of space. The heated air in the furnace 30 also is at the lowest temperature at the charge and discharge ends of the oven so that any air lost through the charge and discharge openings will be at the lowest temperatures.

The temperature distribution in the furnace 30 brought about by the two-zone design, with the air directed in opposite directions from a central point, provides a unique curing process for the wieners which has many advantages over those heretofore known. Because the wieners entering the first zone 60 are subjected to air at the lowest temperature, they tend to be heated more gradually than if, for example, the temperature in the first zone were uniform or highest at the front end. The particular arrangement enables the protein of the meat product to migrate slowly toward the surface thereof and coagulate when reaching the surface so as to produce a skin effect on the wiener, below the cellulose casing. If the temperature of the wiener were raised at an excessively high rate, the protein would coagulate before being able to migrate toward the surface so that the skin effect would be lost, eevn though the wiener product had a certain degree of toughness throughout its thickness. In the second zone 62, the temperature of the wiener sections continues to rise and the desirable color development occurs primarily in this zone. The color results from a nitrite reaction which converts myohemoglobin into myomethemoglobin and then into isonitrosomethemoglobin which has a pink color. This reaction requires both a definite upper limit of temperatures and a rather well defined period of time, it is important that the temperature not exceed approximately 165° F., at which the nitrite tends to be destroyed and a pale, unpalatable color results. An ideal heating process from the color standpoint would be a temperature of approximately 100° F. for a period of time of about six hours, which, however, is too long for a practical commercial process. In the second zone 62, the desirable red color is developed with a compromise of time and temperature and yet the wieners reach the pasteurization temperature, or very close to it, in a reasonable period of time. Thus, when the wiener sections emerge from the oven 30, having traversed both of the heating zones, they have attained proper temperature, proper toughness, and the pasteurization temperature, or very close thereto, in a period of time which renders the overall process practical.

By way of a specific example, the air is supplied through the duct 64 to the first zone 60 at a temperature of 200–240° F., preferably about 220° F., with this temperature dropping to 120–160° F., preferably approximately 140° F. at the charge end of the furnace or the front end of the zone 60 due to adsorption of heat by the load. In this zone, the wiener sections 20 are heated from approximately 60° F. or 70° F. to an interior temperature of approximately 100–135° F. at the rear of the first zone 60. In the second zone 62, the heated air supplied through the supply ducts 78 at a temperature of 200–240° F., preferably approximately 220° F., dropping to 150° F.–170° F., preferably approximately 160° F. at the discharge end of the oven 30 or the rear of the zone 62. The two zones 60 and 62 are of approximately equal length with the wieners passed through both at a uniform speed, but with the temperature in the second zone dropping less because the wiener sections have already been heated by the hot air in the first zone. In the second zone, the wiener sections reach an interior temperature of approximately 150–160° F. by the time they reach the discharge end. The rate of conveyor movement is such that the wieners in the preferred embodiment spend approximately 20 to 40 minutes in each zone and are in the two zones for approximately 40 to 80 minutes. Specifically, the oven 30 is 170 feet long and the wiener sections are carried therethrough at a rate of approximately three feet per minute. This gives a total heating cycle of about one hour.

If desired, the wiener sections can be subjected to the steam spray after leaving the oven for a period of from one to nine minutes to assure that the wiener sections are completely pasteurized. The load is then cooled to approximately 90–130° F. by the water spray for a period of approximately nine minutes. The wiener sections are then further cooled in the tank 36 for nine minutes to a temperature of 38–45° F. by cooling water which is a temperature of approximately 35–38° F. The cooling technique enables the meat product to shrink away slightly from the casing 16 to facilitate removal thereof in the peeling machine 40. It has been found that the continuous process above described results in wieners of improved texture, color and flavor at lower cost and with more uniformity than is now attainable with known batch processes or with existing "fast cooking" continuous processes.

Various modifications of the above described embodiment of the invention will be apparent to those skilled in the art and it is to be understood that such modifications can be made without departing from the scope of the invention if they are within the spirit and tenor of the accompanying claims.

I claim:

1. Apparatus for handling a plurality of wiener sections tied together in end-to-end relationship, said apparatus comprising an overhead rail, a plurality of hangers having wiener-engaging portions to receive wiener sections, means for supporting said hangers by said rail for movement independently of one another in a direction longitudinally of said rail, means for supplying wiener sections into the path of the hangers from a point thereabove, and means for retarding the wiener-engaging portion of each of said hangers before reaching said supply means so that the spacing between the wiener-engaging portions of the retarded hanger and the hanger in front of it will exceed the spacing between the wiener-engaging portions of the hangers in their normal positions to facilitate loading of the wiener sections from said supply means onto said wiener-engaging portions.

2. Apparatus for handling a plurality of wiener sections tied together in end-to-end relationship, said apparatus comprising an overhead rail, a plurality of hangers having wiener-engaging portions to receive wiener sections, a tube located above and terminating slightly above said wiener engaging portions for directing wiener sections downwardly in a line into and through the path of said wiener-engaging portions so that the wiener sections will pass between said hangers and periodically will be intercepted by the wiener-engaging portion of the next hanger, with the wiener sections draping over said wiener-engaging portions in festoons, and means in the path of said wiener-engaging portions for engaging and retarding the wiener-engaging portions of each of said hangers immediately prior to reaching said tube to increase the spacing between the retarded wiener-engaging portion and the wiener-engaging portion immediately in front thereof.

3. Apparatus for handling a plurality of wiener sections tied together in end-to-end relationship, said apparatus comprising an overhead rail, a plurality of hangers including cross bars having wiener-engaging portions to receive wiener sections, means pivotally supporting said hangers from said rail for pivotal movement independently of one another in a direction longitudinally of said rail, means for supplying wiener sections into the path of the cross bars from a point thereabove, and means for retarding the cross bars of each of said hangers before reaching said supply means so that the spacing between the cross bar of the retarded hanger and the hanger in front of it will exceed the spacing between the cross bars of the hangers in their normal positions to facilitate loading of the wiener sections from said supply means onto said weiner-engaging portions of said cross bars.

4. Apparatus for handling a plurality of rows of wiener sections tied together in end-to-end relationship, said apparatus comprising an overhead rail having a downwardly slanted portion, a plurality of hangers having wiener-engaging portions to receive wiener sections, supply means located above and terminating above said wiener-engaging portions for directing the wiener sections downwardly in lines into and through the path of said wiener-engaging portions so that the wiener sections will pass between said hangers and periodically will be intercepted by the wiener-engaging portion of the next hanger, with the wiener sections draping over said wiener-engaging portions in festoons, a generally horizontally-disposed conveyor located to one side of said slanted portion of asid overhead rail and extending in the same forward direction as said rail, one end of said conveyor being spaced from the path of the wiener-engaging portions of said hangers and carrying the wiener sections off said hangers with the rows of wiener sections parallel to each other and to the length of said conveyor as they move from a level above to a level below said conveyor.

References Cited by the Examiner

UNITED STATES PATENTS

| | | | |
|---|---|---|---|
| 1,825,528 | 9/31 | Knudsen | 99—109 |
| 2,133,391 | 10/38 | Lemmon | 198—177 |
| 2,537,053 | 1/51 | Hemmeter | 99—443 |
| 2,758,535 | 8/56 | Roberts | 99—261 |
| 2,793,582 | 5/57 | Rothe et al. | 99—443 |
| 2,832,278 | 4/58 | Taranik | 99—259 |
| 2,918,164 | 12/59 | Austin et al. | 198—177 |
| 2,970,364 | 2/61 | Friedel | 226—104 X |
| 2,973,277 | 2/61 | Barnett et al. | 99—229 |
| 2,976,983 | 4/61 | Zebarth | 198—177 |

ROBERT B. REEVES, *Acting Primary Examiner.*

HYMAN LORD, JEROME SCHNALL, RAPHAEL M. LUPO, SAMUEL F. COLEMAN, *Examiners.*